United States Patent
Priego et al.

(10) Patent No.: US 10,270,346 B2
(45) Date of Patent: Apr. 23, 2019

(54) MULTIPHASE POWER REGULATOR WITH DISCONTINUOUS CONDUCTION MODE CONTROL

(71) Applicant: TEXAS INSTRUMENTS INCORPORATED, Dallas, TX (US)

(72) Inventors: Antonio Priego, Freising (DE); Neil Gibson, Freising (DE); Syed Wasif Mehdi, Freising (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/853,494

(22) Filed: Dec. 22, 2017

(65) Prior Publication Data
US 2018/0294726 A1 Oct. 11, 2018

Related U.S. Application Data

(60) Provisional application No. 62/482,741, filed on Apr. 7, 2017.

(51) Int. Cl.
*H02M 3/158* (2006.01)
*H02M 3/156* (2006.01)
*H02M 1/00* (2006.01)

(52) U.S. Cl.
CPC .. *H02M 3/1584* (2013.01); *H02M 2001/0025* (2013.01); *H02M 2001/0032* (2013.01);
(Continued)

(58) Field of Classification Search
CPC ....... H02M 3/1584; H02M 2001/0048; H02M 2003/1586; H02M 2003/1566;
(Continued)

(56) References Cited

U.S. PATENT DOCUMENTS 5,481,178 A * 1/1996 Wilcox ................. H02M 3/156
323/224
5,521,809 A * 5/1996 Ashley ...................... H02J 1/10
307/82

(Continued)

OTHER PUBLICATIONS

PCT Search Report for Application No. PCT/US 2018/026586, dated Jul. 26, 2018.

*Primary Examiner* — Adolf D Berhane
(74) *Attorney, Agent, or Firm* — Andrew Viger; Charles A. Brill; Frank D. Cimino

(57) ABSTRACT

A multiphase power regulator includes a plurality of phases coupled in parallel to provide a load current as a combination of phase currents at an output voltage, each phase including at least one power transistor switched to provide a respective phase current based at least in part on a comparator output signal, and a current-sense low pass filter to sense the phase current. The regulator further includes a gm stage to generate the current set point voltage based at least in part on the output voltage, a comparator to compare a voltage from the current-sense low pass filters to the current set point voltage and a current set point adjustment circuit to provide an auxiliary control signal to decrease the current set point voltage responsive to a change in comparator output and then to increase the current set point voltage responsive to another change in comparator output.

19 Claims, 8 Drawing Sheets

(52) U.S. Cl.
CPC .............. *H02M 2003/1566* (2013.01); *H02M 2003/1586* (2013.01)

(58) Field of Classification Search
CPC .... H02M 3/158; H02M 3/1582; H02M 3/156; H02M 3/157; G05F 1/565; G05F 1/562; G05F 1/575
USPC ....... 323/237, 271, 272, 273, 274, 282, 283, 323/284, 285, 300
See application file for complete search history.

(56) References Cited

U.S. PATENT DOCUMENTS

| | | | |
|---|---|---|---|
| 7,615,982 B1* | 11/2009 | Guo .................... | H02M 3/1584 323/271 |
| 2007/0139973 A1 | 6/2007 | Leung | |
| 2010/0033153 A1* | 2/2010 | Xing .................... | H02M 3/156 323/288 |
| 2010/0079127 A1* | 4/2010 | Grant .................... | H02M 3/156 323/285 |
| 2010/0250913 A1 | 9/2010 | Breen, III et al. | |
| 2012/0043946 A1* | 2/2012 | Dong .................... | H02M 3/156 323/234 |
| 2013/0049715 A1* | 2/2013 | Groom ................. | H02M 3/156 323/271 |
| 2013/0106256 A1 | 5/2013 | Mizukoshi et al. | |
| 2013/0300392 A1* | 11/2013 | Laur .................... | H02M 3/156 323/284 |
| 2017/0019026 A1* | 1/2017 | Nien .................. | H02M 3/1584 |
| 2018/0054124 A1* | 2/2018 | Barth ................. | H02M 3/1584 |

\* cited by examiner

MULTIPHASE POWER REGULATOR WITH DISCONTINUOUS CONDUCTION MODE CONTROL

CROSS REFERENCE TO RELATED APPLICATION(S)

This application claims priority to U.S. Provisional Application Ser. No. 62/482,741 entitled "Method and Apparatus for High Efficient Multiphase Switching Regulators" filed Apr. 7, 2017, and incorporated herein by reference.

BACKGROUND

A multiphase power regulator (such as buck, boost, or buck-boost) employs multiple power stages, or phases, coupled in parallel to supply power to a bad (such as load current at a regulated voltage). Each power phase includes one or more power transistor/switches connected at a switch node to an inductor, with the parallel phases sharing input and output capacitors, and with a central controller for sequencing phase activation and providing phase duty cycle control. Multiphase regulators supply regulated power by selectively activating/inactivating the phases, with each active phase delivering load current based on a controlled switching duty cycle. Multiphase regulators can be designed for operation in discontinuous conduction mode (DCM) at light/medium loads that require lower load current (such that, during an active phase switching cycle, the phase operates in DCM), and/or for operation in continuous conduction mode (CCM) at medium/heavy loads that require higher load current (such that, during a phase switching cycle, each phase operates in CCM), including in some designs transitioning between DCM and CCM based on load current demand.

SUMMARY

In aspects of the disclosure, a multiphase power regulator includes a plurality of phases coupled in parallel to provide a load current as a combination of phase currents at a regulated output voltage, each phase including at least one power transistor switched to provide a respective phase current based at least in part on a comparator output signal, and a current-sense low pass filter to sense an inductor current. The regulator further includes a gm stage including a transconductance amplifier to generate a current set point voltage based at least in part on the output voltage, a comparator to compare a voltage from the low pass filters of the phases to the current set point voltage, and to generate the comparator output signal, and a current set point adjustment circuit to provide an auxiliary control signal to decrease the current set point voltage responsive to a change in the comparator output signal, and then to increase the current set point voltage to the comparator responsive to another change in the comparator output signal.

In other aspects of the disclosure, a circuit for use in a multi-phase regulator including a plurality of phases coupled in parallel to provide a load current as a combination of phase currents, at a regulated output voltage, includes a phase control circuit to control generation of the phase currents based at least in part on a current set point signal, a transconductance error amplifier to provide at an output the current set point signal, and an auxiliary control circuit, coupled to the output of the transconductance error amplifier, to generate an auxiliary control signal to adjust the current set point signal. The auxiliary control circuit includes a current source and a resistor coupled to the current source at a first node. The circuit also includes a capacitor coupled in parallel to the resistor and a switch coupled in parallel to the resistor and the first capacitor between the first node and a ground.

In other aspects of the disclosure, a method for use in a multiphase power regulator including a plurality of phases coupled in parallel to provide a load current as a combination of phase currents, at a regulated output voltage includes determining, by a comparator, that a magnitude of a first signal exceeds a voltage from a phase of the multiphase power regulator, the voltage corresponding to current supplied by the phase. In response to the determination, the method includes triggering a phase of the multiphase power regulator to supply the associated phase current through a phase inductor, and decreasing the magnitude of the first signal to the comparator. After decreasing the first signal's magnitude, the method then includes increasing the first signal's magnitude.

BRIEF DESCRIPTION OF THE DRAWINGS

For a detailed description of various examples, reference will now be made to the accompanying drawings in which:

FIG. 2 illustrates example waveforms of the operation of the multiphase regulator during discontinuous conduction mode (DCM) using an auxiliary ramp control surface in accordance with the disclosure.

FIG. 3 illustrates additional example waveforms of the multiphase regulator during DCM operation in which the phases of the multiphase regulator begin to overlap in accordance with the disclosure.

FIG. 4 illustrates further example waveforms of the multiphase regulator during DCM operation in which the phases of the multiphase regulator begin to overlap in accordance with the disclosure.

FIG. 5 illustrates additional example waveforms of the multiphase regulator during DCM operation in which the phases of the multiphase regulator further overlap in transition from DCM to CCM operation in accordance with the disclosure.

DETAILED DESCRIPTION

A multiphase switching power regulator employs multiple power stages coupled in parallel to produce a regulated output voltage. The control circuit within a multiphase regulator that triggers each phase to turn on generally uses a "control surface" to determine when to turn on a given phase. A control surface may be a signal or relationship between multiple signals that indicates when the phase is to } be enabled. A control surface useful during DCM operation may not necessarily be useful during CCM operation. Further, the transition between DCM and CCM operation may be problematic given the type of control surface used by the regulator (e.g., creating discontinuities and noise) on the output voltage.

The disclosure is directed to a multiphase switching (power) regulator that employs a particular auxiliary ramp control surface that is capable of controlling the regulator during DCM operation, and during CCM operation including providing a smooth transition between DCM and CCM operation. The regulator continues to provide a regulated output voltage even during current levels at the higher range of DCM operation.

Figure 1A:
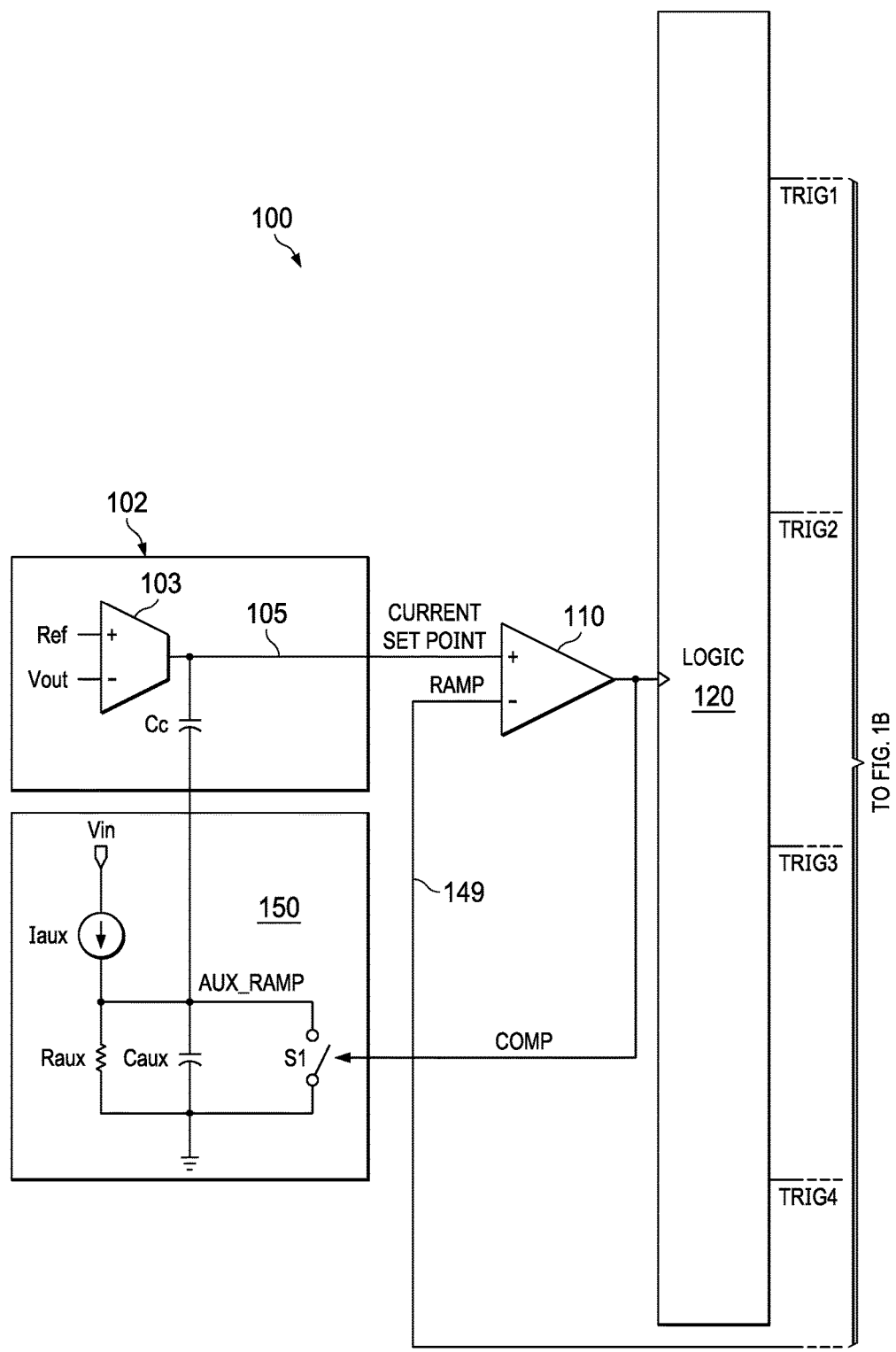
FIGS. 1A and 1B (collectively, FIG. 1) illustrates an example of a multiphase switching power regulator, including an example current set point adjustment circuit for generating an auxiliary ramp control surface in accordance with the disclosure.
Figure 1B:
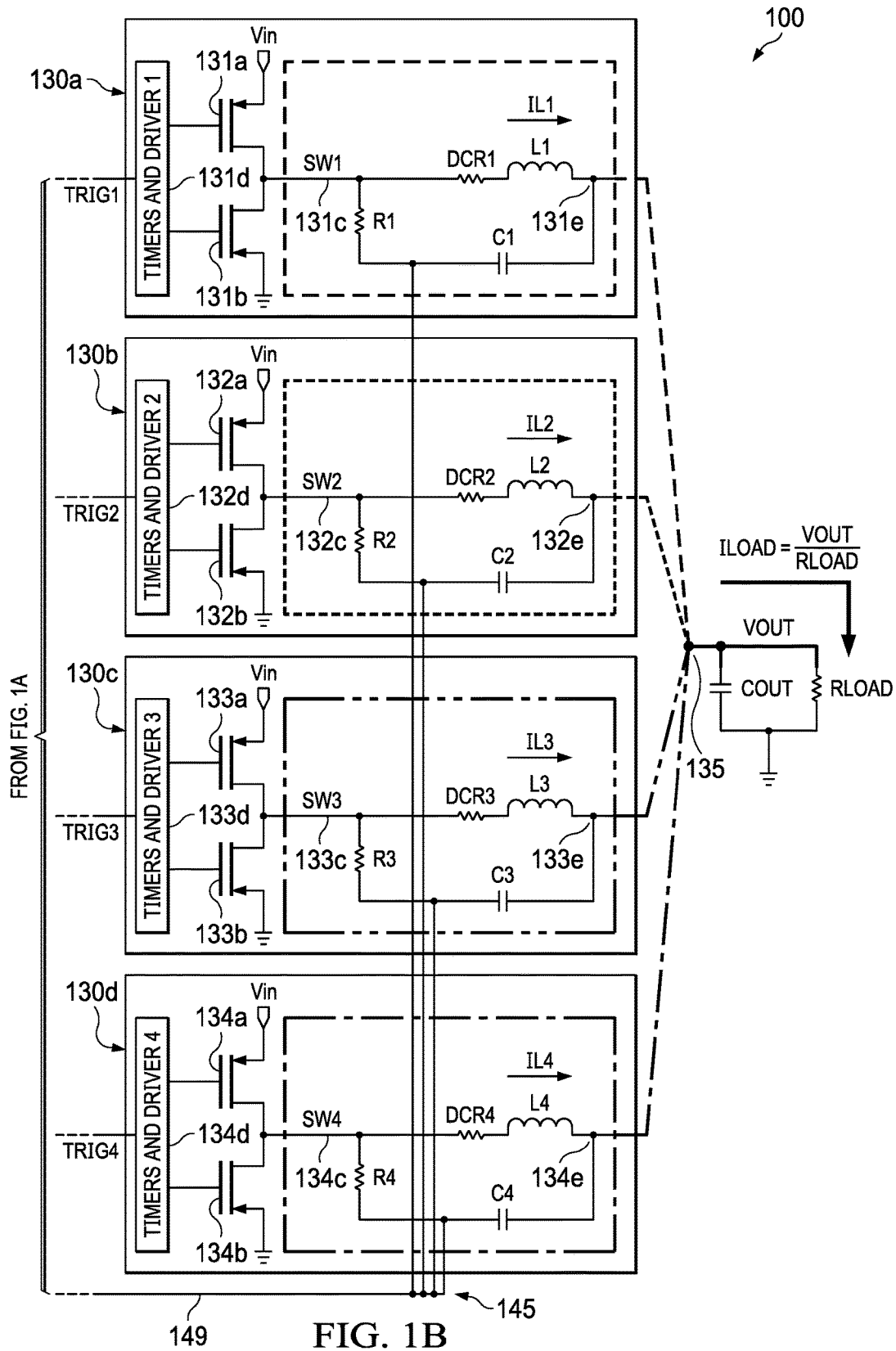

FIG. 1 (shown as FIGS. 1A and 1B) shows an example of a multiphase switching regulator 100 (also referred to as a switch mode power supply or SMPS), including an example current set point adjustment circuit for generating an auxiliary ramp control surface in accordance with this disclosure.

Referring to FIG. 1A, the example multiphase switching regulator 100 includes multiphase control circuitry including a gm (transconductance) stage 102 (which converts a voltage to a current), a comparator 110, a current set point adjustment circuit 150, and a logic circuit 120. Referring to FIG. 1B, the example buck regulator 100 includes phases 130a-130d, including, in this example, high/low side switching (power) transistors 131a/131b-134a/134b connected at switch nodes 131c-134c (SW1-SW4) to phase inductors L1-L4. Timers/drivers 132a-132d (when triggered by trigger signals TRIG1-TRIG4 from logic circuit 120), provide duty-cycle controlled gate drive to the high/low side switching transistors. For active phases, phase currents are provided through the phase inductors L1-L4 to a current-summing node 135, coupled to a shared output capacitor COUT in parallel with a load represented by Rload. Current-sense filters R1C1-R4C4 are connected across the phase inductors L1-L4, between respective switch nodes 131c-134c and output nodes 131e-134e, providing current-sense feedback through summing node 145 to the control circuitry of FIG. 1A, as a current-sense Ramp signal 149 (input to comparator 110).

The example multiphase switching regulator 100 in FIG. 1 is based on a buck topology. In other examples, the phase control methodology including current set point adjustment using an auxiliary ramp control surface according to the disclosure can be adapted for other switching regulator topologies, such as boost and buck-boost.

The example multiphase switching regulator 100 in FIG. 1 is based on synchronous power stages with high/low side power switches 131a/131b-134a/134b. In this example, not shown is the mechanism/circuitry required, for DCM operation, to end the low side phase to prevent inductor current reversal, such as a zero current comparator or other detector (for CCM operation, none of the inductor currents reach zero). In other examples, An alternative to implementing zero current detection to prevent inductor current reversal in DCM, is to use asynchronous power stages. The phase control methodology including current set point adjustment using an auxiliary ramp control surface according to the disclosure can be adapted for asynchronous power stages, such as, for the example in FIG. 1, by replacing the low side power switches 131b-134b with diodes. Use of asynchronous power stages eliminates inductor current reversal, and therefore the requirement for zero current detection even for DCM operation.

In some examples, multiphase switching regulator 100, including current set point adjustment with an auxiliary ramp control surface according to the disclosure, can be implemented with a converter that integrates the control circuitry of FIG. 1A, and for each phase, the timers/drivers and the power switches, and the current-sense RC filters, the converter to couple through switch node terminal SW1-SW4 to external phase inductors. In other examples, a multiphase regulator can be implemented with a controller that integrates the control circuitry of FIG. 1A and the timers/drivers, the controller to couple to external power transistors through gate drive terminals. In other examples, the controller can be implemented with the control circuitry of FIG. 1A, to couple to external gate drivers for the external power transistors.

The example of FIG. 1 comprises a four-phase switching regulator, but the number of phases can be other than four in other examples (e.g., two or more). The voltage on the output capacitor COUT represents the output voltage Vout of the multi-phase SMPS 100. The resistance Rload refers to a load that may be powered by the switching regulator 100, and is not part of the switching regulator itself.

The architecture of each phase of the voltage converter is the same in this example, but may vary between the phases in other implementations. Phase 130a comprises a timers and driver 131d coupled to a high side transistor 131a and a low side transistor 131b. Once triggered (e.g., by way of a trigger ("Trig") signal) from logic 120), the timers and driver 131d asserts gate signals to turn on and off the corresponding high and low transistors 131a, 131b. The connection between the high and low side transistors is a switch node 131c (SW1). Switch node 131c also couples to an inductor L1 (DCR1 represents the direct current (DC) resistance of the inductor L1). The opposite terminal of inductor L1 couples to the output capacitor Cout. A current-sense low pass filter comprising resistor R1 and capacitor C1 is coupled in parallel across the inductor L1, between switch node 131c (SW1) and output node 131e. Similarly, phase 130b includes high and low side transistors 132a and 132b coupled together at a switch node 132c (SW2), a timer and driver 132d, an inductor L2 coupled to the output capacitor Cout, and current-sense filter R2/C2. Phase 130c includes high and low side transistors 133a and 133b coupled together at a switch node 133c (SW3), a timer and driver 133d, an inductor L3 coupled to the output capacitor Cout, and current-sense filter R3/C3. Finally, phase 130d includes high and low side transistors 134a and 134b coupled together at a switch node 134c (SW4), a timer and driver 134d, an inductor L4 coupled to the output capacitor Cout, and current-sense filter R4/C4.

Referring to FIGS. 1A/1B, the nodes between each current-sense filter within a phase are connected together at a summing node 145 and provided to a negative input of comparator 110 as the current-sense Ramp signal 149. The RC current-sense filter of each phase 130a-130d is a low pass filter that produces a waveform that is generally proportional to the current through the corresponding inductor. During DCM operation, there is a portion of time during each period when none of the phases 130a-130d is active. During that time, the Ramp signal is equal to Vout. During CCM operation, the phases are continuously active to generate current through the inductors.

The example gm stage 102 includes an transconductance error amplifier 103, which converts the difference between a reference voltage (Ref) and a voltage based on Vout into a set point current, and a compensation capacitor Cc (gm stage 102 can also be referred to as a gm/C stage, as differentiated from, for example, an operational amplifier with feedback capacitor). The voltage Vout provided to the error amplifier 103 may be a voltage derived from a voltage divider (e.g., a resistor divider) coupled to the output of the phases 130a-130d. In other examples, the voltage Vout provided to the error amplifier 103 is the output of the phases 130a-130d (i.e., not a scaled version of phases' output voltage). The node connecting the output of the error amplifier 103 to the compensation capacitor Cc is designated as the Current Set Point signal 105 and is coupled to the positive input of the comparator 110. The comparator 110 thus compares the Current Set Point signal to the current-sense Ramp signal 149. As the Current Set point signal is provided to the positive input of the comparator and the Ramp signal is provided to the negative input of the comparator, the comparator's output to logic 120 will be a logic high when Current Set Point is greater than Ramp and a logic low otherwise. In other examples, the signals input to the comparator can be the opposite to that shown in the example of FIG. 1 (i.e., Current Set point signal provided to the positive input of the comparator and the Ramp signal provided to the negative input).

In the example of FIG. 1, the comparator's output is low while the current-sense Ramp signal is greater than Current Set Point. When Current Set Point exceeds Ramp, the comparator's output transitions to a logic high state thereby causing logic 120 to trigger a phase from among phases 130a-130d to initiate a new cycle in which that phase's timers and driver (e.g., timers and driver 131d) first switches on the corresponding high side transistor (e.g., high side transistor 131a) and then the low side transistor (e.g., low side transistor 131b), with a controlled TON/TOFF duty cycle. For example, a multiphase switching regulator can be implemented according to this disclosure with PFM duty cycle modulation based on constant TON time, and controlled TOFF.

The current set point adjustment circuit 150 implements an auxiliary ramp control surface usable during all of the operations modes of the multi-phase SMPS 100 including CCM and DCM. The example current set point adjustment circuit 150 in FIG. 1 includes a current source Iaux, a resistor Raux coupled to the current source Iaux. The resistor Raux also couples to the compensation capacitor Cc. The current set point adjustment circuit 150 further includes a capacitor Caux coupled in parallel to the resistor Raux. The node labeled AUX_RAMP couples to the compensation capacitor Cc, current source Iaux, resistor Raux and capacitor Caux as shown, with RauxCaux setting a pre-defined time constant for the AUX_RAMP control surface signal. The auxiliary ramp (control surface) signal at the AUX_RAMP node is thus AC coupled to the output of the error amplifier through the compensation capacitor. A switch S1 is also coupled in parallel to the resistor Raux and to capacitor Caux between the AUX_RAMP node and ground.

Not only is the output signal from the comparator 110 coupled to logic 120 and used to trigger the phases, but the output signal from the comparator 110 is also coupled to the switch S1 and used as a control signal for the switch. Thus, the comparator's output signal (labeled as Comp in FIG. 1) is used to turn on and off switch S1 to generate the auxiliary ramp control surface. In the example of FIG. 1, when the Current Set Point signal is smaller than the Ramp signal, the output of the comparator 110 (Comp) is a logic low which causes the switch S1 to be on. When the Current Set Point signal is greater than the Ramp signal, Comp from the comparator 110 is a logic high which causes the switch S1 to be off. When S1 is on, the AUX_RAMP node is coupled to ground thereby pulling down the voltage on AUX_RAMP and thus, through the compensation capacitor Cc also pulling down the Current Set Point signal as well.

Figure 2:
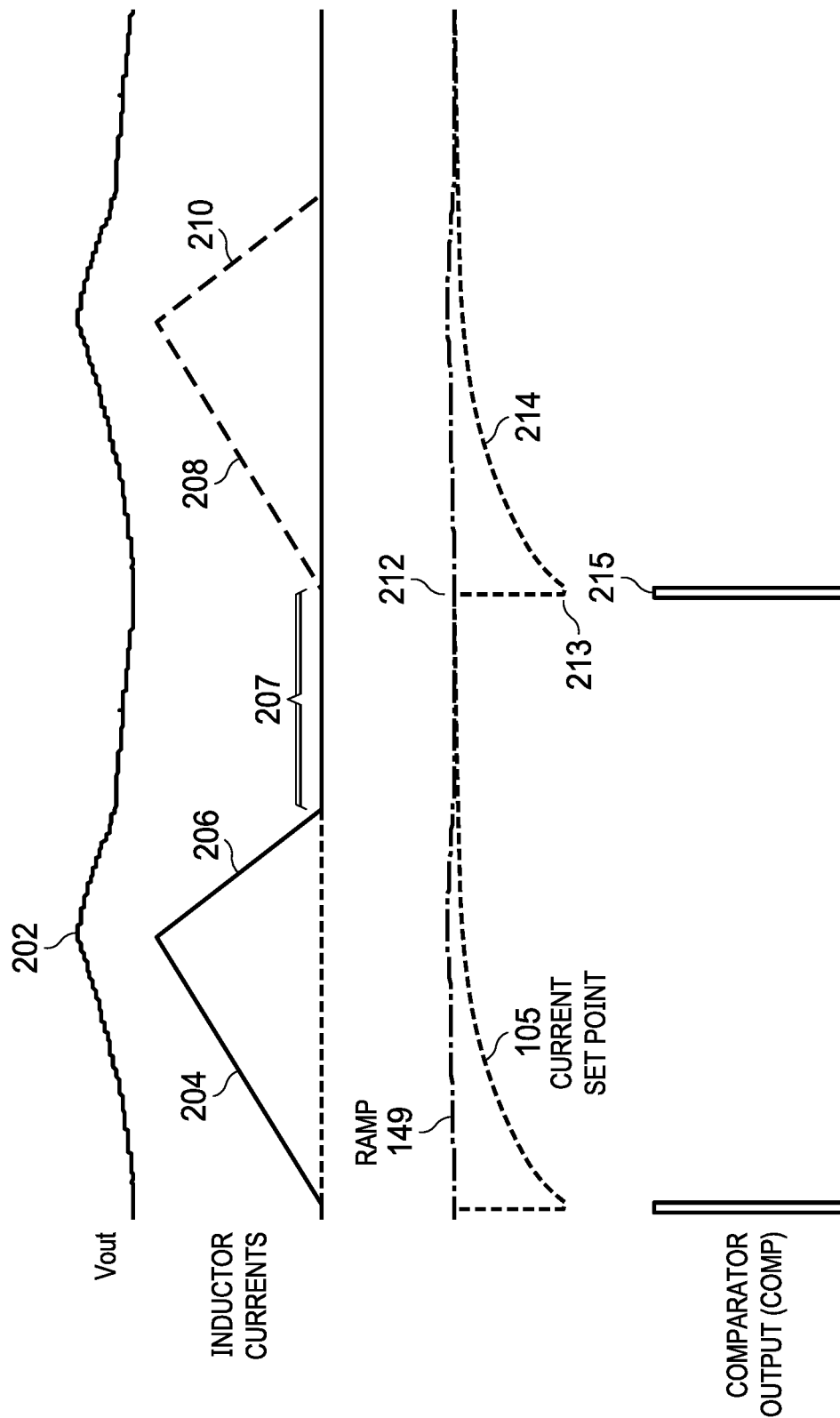
FIGS. 2-5 illustrate example waveforms of the operation of the example multiphase regulator during discontinuous conduction mode (DCM), including inductor currents, as the regulator transitions, in some examples, to continuous conduction mode (CCM), based on use of the auxiliary ramp control surface, in accordance with the disclosure.

FIG. 2 illustrates an example of DCM operation of the multiphase SMPS 100 in accordance with the disclosure. The figure shows an example Vout waveform 202 which depicts some voltage ripple. The figure also shows example inductor currents. The current through each inductor is triangular in shape as shown. The generally linear increase in inductor current followed by the generally linear decrease represents the current through a given phase inductor L1, L2, . . . . For example, reference numerals 204 and 206 identify the increase and subsequent decrease in current through one phase inductor and 208 and 210 identify the increase/decrease in current through another phase inductor. Reference numeral 207 represents the period of time between the end of one phase's operation and the beginning of the next phase's operation in which no current flows through the inductors from the corresponding high and low side transistors.

Referring still to FIG. 2 (and with reference to FIG. 1), an example of the current-sense RAMP signal 149 is shown along with the Current Set Point signal 105. As the Current Set Point signal exceeds the magnitude of the Ramp signal 149 (denoted at 212), the output of the comparator 110 becomes a logic high thereby turning on switch SW1 which causes the AUX_RAMP node to be pulled down (voltage step). As a result of pulling down AUX_RAMP, the Current Set Point signal 105 also is pulled low as shown at 213. Forcing Current Set Point 105 to a logic low level (and thus below Ramp 149) causes the comparator's output to switch to a logic low level as well. With the comparator's output forced low again, switch S1 is turned off which thereby permits the Current Set point signal level to begin to increase. The increase is non-linear and is generally according to a time constant defined by Raux and Caux. The momentary transition of the comparator's output from low to high and back to low is depicted as a pulse at 215. Each comparator output pulse causes the logic 120 to trigger operation of another phase of the multiphase SMPS 100. The phases can be triggered in a round-robin sequence in which each of, for example, four phases is triggered every four comparator output pulses 215. In such examples, all phases remain operational during the DCM operation of the voltage converter.

Figure 3:
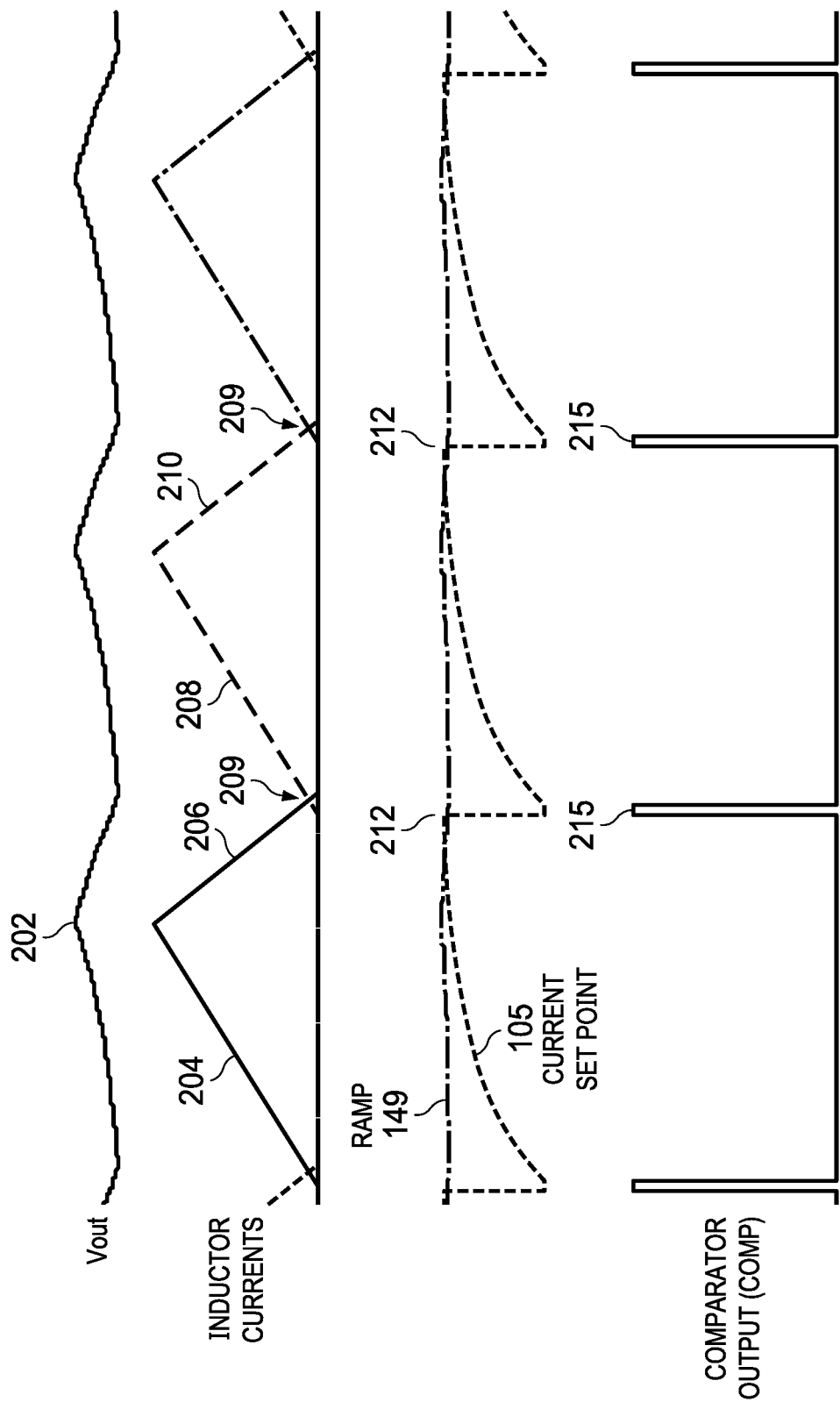

As the load powered by the voltage converter begins to demand more and more current, the time period 207 between phases begins to decrease. FIG. 3 illustrates the operation of the voltage converter as the operation of the phases begins to overlap as identified at reference numeral 209. The overlap represents the decrease in current of one inductor at the end of the phase's operation overlapping in time with the increase in current at the beginning of operation of the next phase. As a result, the comparator output pulses 215 begin to get closer and closer together with respect to time, thereby triggering the phases 130a-130d to operate more frequently.

Figure 4:
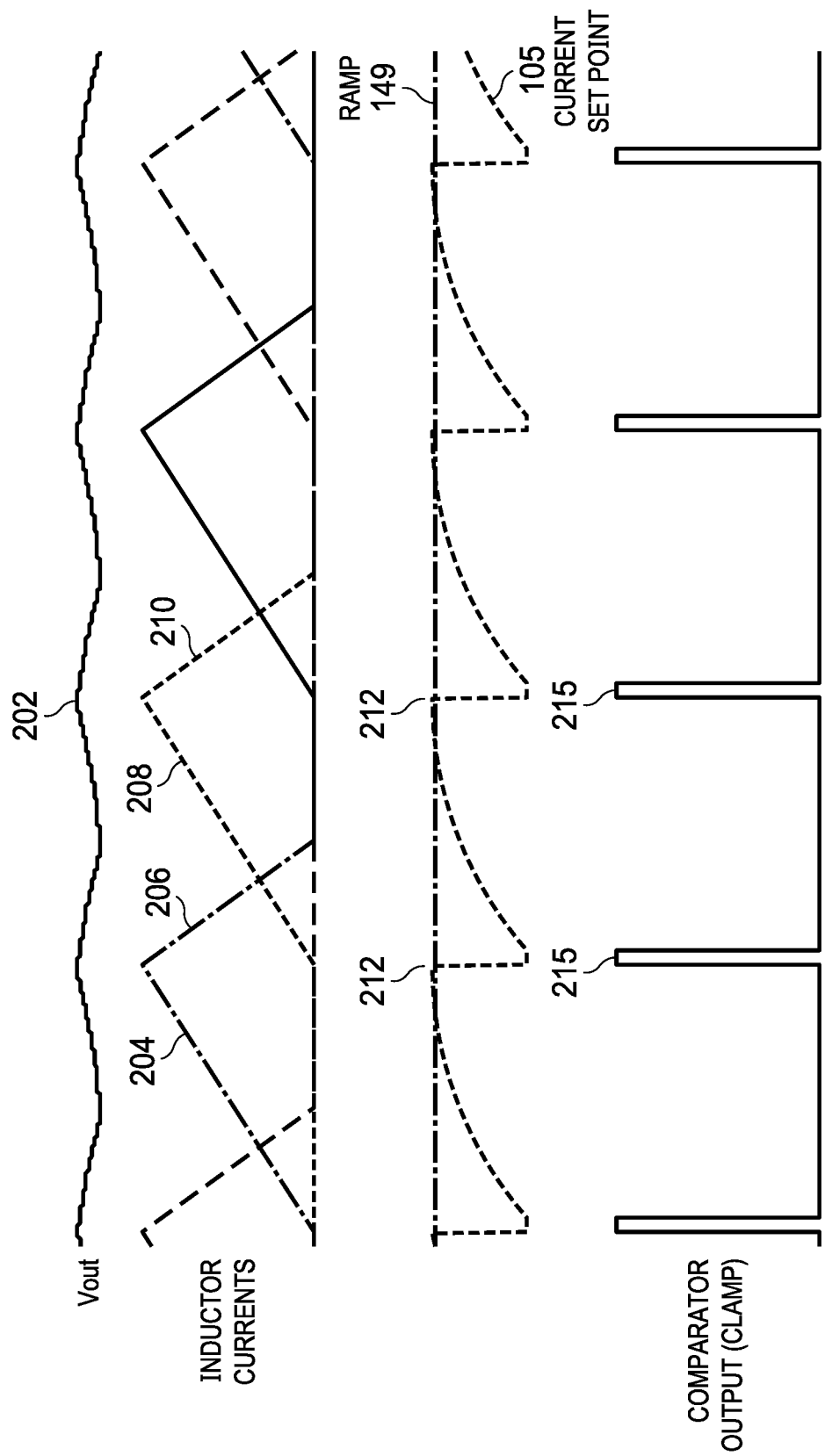
Figure 5:
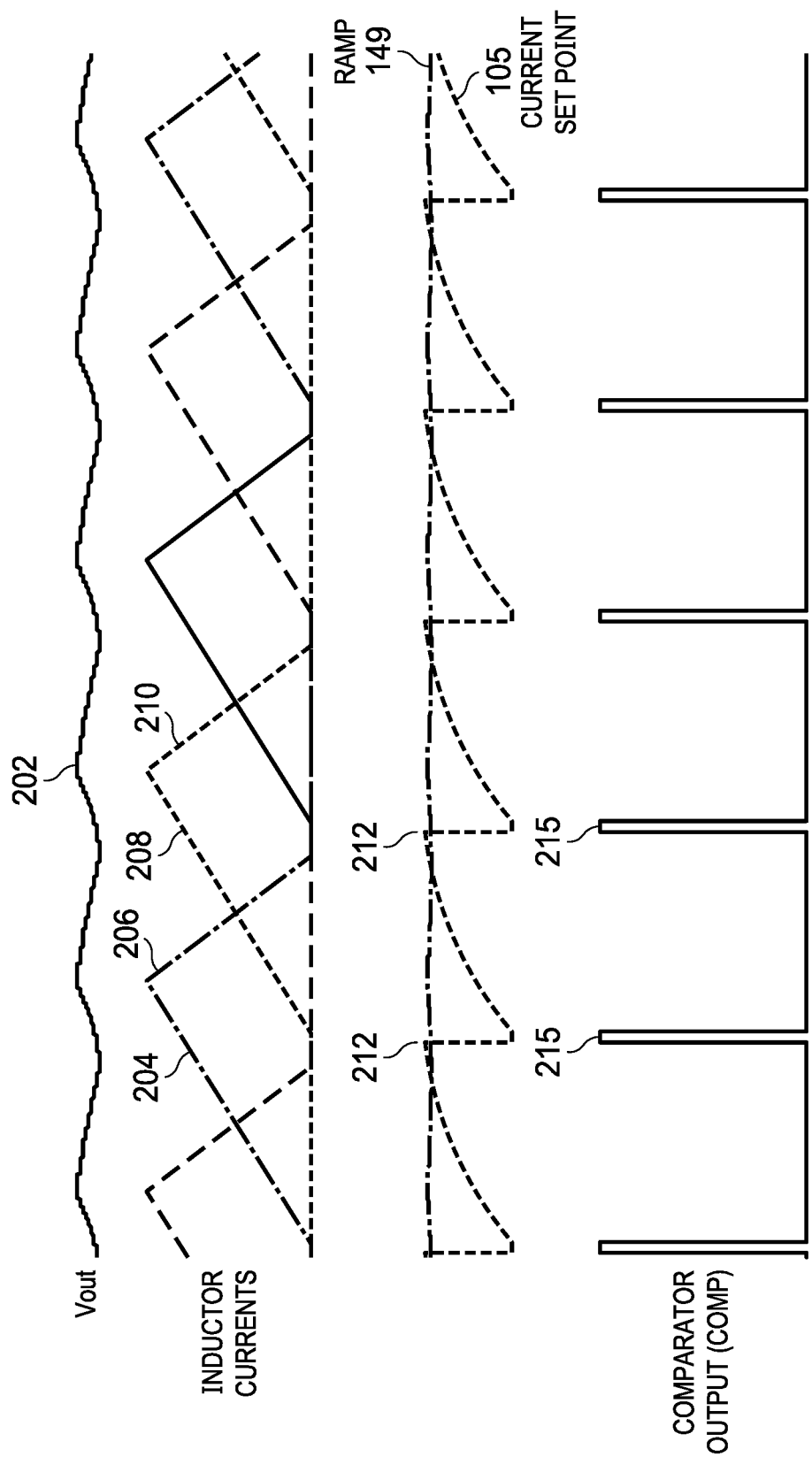

FIG. 4 illustrates the converter's operation as the load demands even more current. The overlap in operation of the phases is more pronounced in FIG. 4 than in FIG. 3. The comparator output pulses are even closer together than was the case for FIG. 3. In FIG. 5, the overlap in operation of the phases is even greater and consequently the comparator output pulses are even closer together than in FIG. 4.

Figure 6:
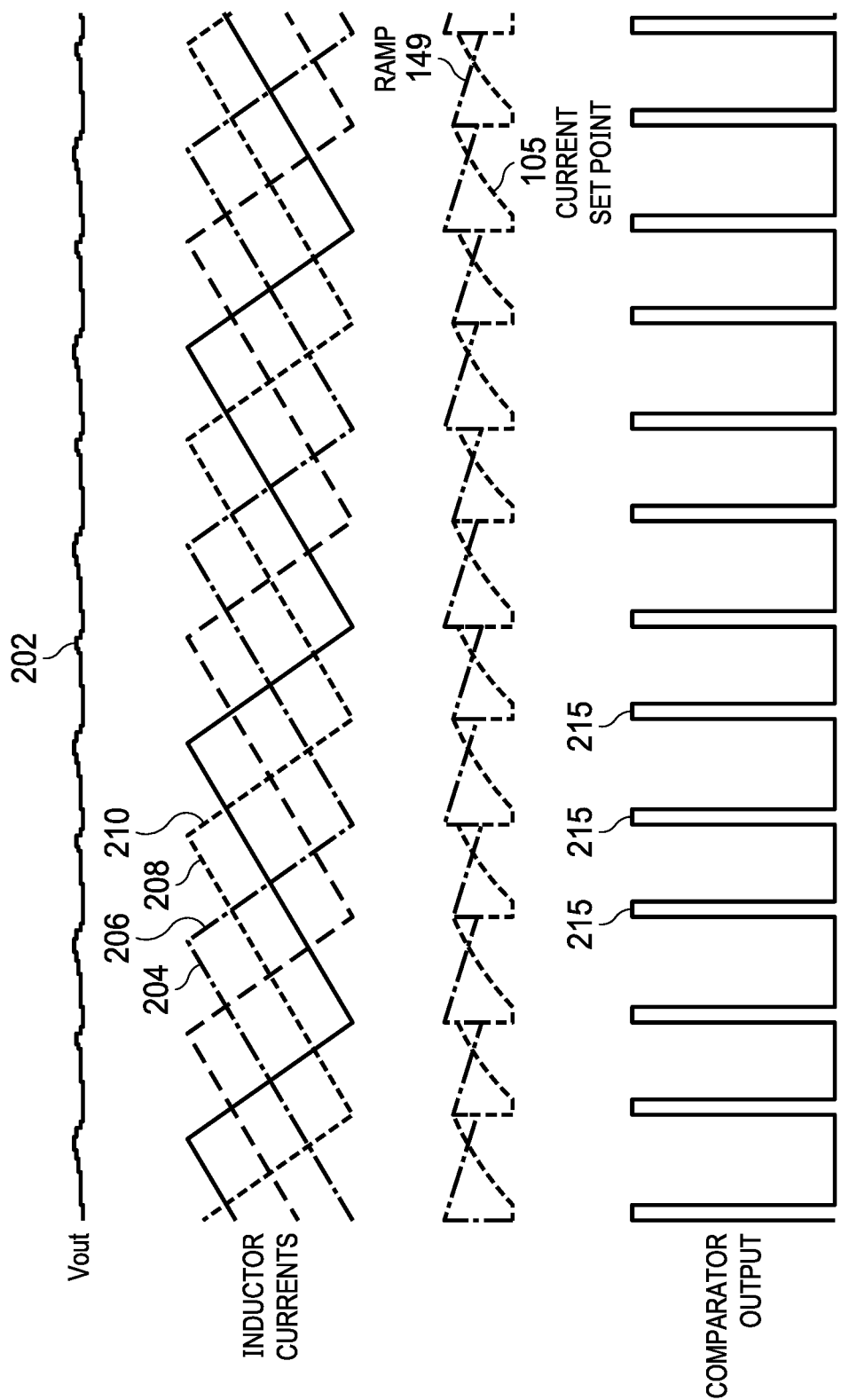
FIG. 6 illustrates example waveforms of the SMPS during CCM based on using the same auxiliary ramp control surface in accordance with the disclosure.

Despite the phases being triggered to operate more frequently from FIGS. 2-5 as the load continues to demand more current, there is still a DCM period of time (albeit shrinking from FIGS. 2-5) between switching cycles of the same phase. FIG. 6 shows the operation of the multiphase switching regulator as the load current increases to the point that the regulator operates in the CCM mode in which current continuously flows through each inductor.

FIGS. 2-5 thus illustrate the transition of the multiphase regulator's operation from DCM operation to CCM operation while using the current set point adjustment circuit to control the operation of the phases by providing an auxiliary ramp control surface. In the disclosed examples, a single control surface is thus used to control the converter's phases for both DCM and CCM operation. The current set point adjustment circuit 150 is configured to increase and decrease the Current Set Point voltage during DCM operation of the voltage converter and during CCM operation of the voltage converter. The transition between CCM and DCM operation is seamless with little or no noise superimposed on the output voltage Vout which might otherwise occur if different control surfaces were used for DCM and CCM operations.

Figure 7:
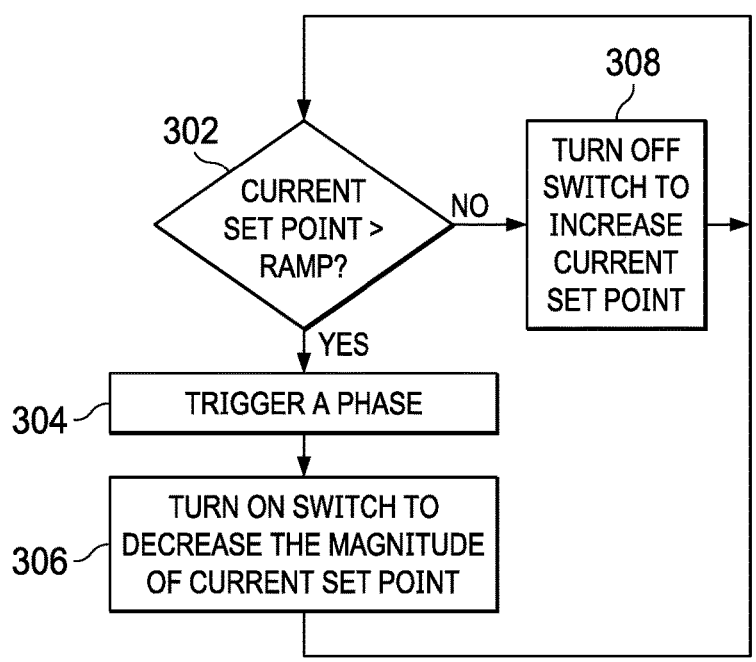
FIG. 7 shows an example of a method in accordance with the disclosure.

FIG. 7 illustrates a method performable by the example multiphase switching power regulator illustrated in FIG. 1. At 302, the method includes determining whether the Current Set Point signal 105 is greater than the current-sense Ramp signal 149. In the example of FIG. 1, this operation is performed by the comparator 110 as the comparator determines whether a magnitude of the Current Set Point signal exceeds the Ramp signal. In response to the determination that Current Set Point exceeds Ramp, the method includes triggering one of the phases (e.g., in a sequential round robin fashion) to operate (304) and then at 306 decreasing the magnitude of the Current Set Point signal to the comparator 110 (voltage step 213 in FIG. 2).

After decreasing the magnitude of the Current Set Point signal, the comparator then determines (again at 302) that the Current Set Point signal is smaller than the Ramp signal. This latter determination causes at 308 the magnitude of the Current Set Point signal to increase (e.g., by turning off switch SW1) according to the RauxCaux time constant.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The above description is meant to be illustrative of the principles of the disclosure, including various examples. Numerous variations and modifications will become apparent to those skilled in the art once the above disclosure is fully appreciated. It is intended that the following claims be interpreted to embrace all such variations and modifications.

What is claimed is:

1. A multiphase power converter, comprising:
 a plurality of phases coupled in parallel to provide a load current as a combination of phase currents, at a regulated output voltage, each phase including at least one power transistor switched to provide a respective phase current based at least in part on a comparator output signal, and a current-sense low pass filter to sense the phase current;
 a gm stage including a transconductance amplifier to generate a current set point voltage based at least in part on the output voltage;
 a comparator to compare a voltage from the current-sense low pass filters of the phases to the current set point voltage, and to generate the comparator output signal; and
 a current set point adjustment circuit coupled to an output of the gm stage and an output of the comparator, the current set point adjustment circuit to provide an auxiliary control signal to decrease the current set point voltage responsive to a change in the comparator output signal, and then to increase the current set point voltage to the comparator responsive to another change in the comparator output signal.

2. The converter of claim 1, wherein the current set point adjustment circuit includes a switch controlled by the comparator output signal.

3. The converter of claim 1, wherein the gm stage includes a compensation capacitor, and the current set point adjustment circuit includes:
 a current source;
 a resistor coupled to the current source and, at a first node, to the compensation capacitor;
 a first capacitor coupled in parallel to the resistor; and
 a switch coupled in parallel to the resistor and to the first capacitor between the first node and a ground;
 the auxiliary control signal provided at the first node.

4. The converter of claim 3, wherein the switch includes a control input controlled by the comparator output signal.

5. The converter of claim 3, wherein the first node is capacitively coupled to the output of the transconductance amplifier through the compensation capacitor.

6. The converter of claim 3, wherein:
 the switch turns on responsive to the comparator output signal becoming a logic high causing the current set point voltage to decrease;
 the comparator output signal becomes a logic low responsive to the decrease in the current set point voltage thereby causing the switch to turn off; and
 responsive to the switch turning off, the current set point voltage increases according to a time constant set by the resistance of the resistor and the capacitance of the first capacitor.

7. The converter of claim 1, wherein the converter is configured to selectively operate in continuous conduction mode and in discontinuous conduction mode, and the current set point adjustment circuit to increase and decrease the current set point voltage during discontinuous conduction mode and during continuous conduction mode.

8. A circuit for use in a multi-phase regulator including a plurality of phases coupled in parallel to provide a load current as a combination of phase currents, at a regulated output voltage, the circuit comprising:
 a phase control circuit to control generation of the phase currents based at least in part on a current set point signal;
 a transconductance amplifier to provide at an output the current set point signal;
 an auxiliary control circuit, coupled to the output of the transconductance amplifier, to generate an auxiliary control signal to adjust the current set point signal, the auxiliary control circuit including:
 a current source;
 a resistor coupled to the current source at a first node;
 a capacitor coupled in parallel to the resistor; and a switch coupled in parallel to the resistor and the first capacitor between the first node and a ground.

9. The circuit of claim 8, wherein the switch includes a control input to be coupled to an output of the phase control circuit.

10. The circuit of claim 9, wherein the phase control circuit comprises a comparator, and the auxiliary control circuit is AC coupled through a compensation capacitor to a first input of the comparator and to the output of the transconductance amplifier.

11. The circuit of claim 9, wherein, responsive to the switch turning on, the circuit causes a change to a voltage on a first input of the comparator.

12. The circuit of claim 9, wherein, responsive to an output of the comparator changing state, the switch turns on thereby causing a voltage on a first input of the comparator to be pulled down.

13. The circuit of claim 9, wherein, responsive to an output of the comparator becoming a logic high, the switch turns on thereby pulling low a second input of the comparator and causing the output of the comparator to become a logic low.

14. The circuit of claim 13, wherein the switch is caused to turn off responsive to the output of the comparator becoming the logic low to cause a voltage on the second input of the comparator to increase.

15. The circuit of claim 14, wherein the voltage on the second input of the comparator increases at a rate dictated by a time constant set by the resistance of the resistor and the capacitance of the capacitor.

16. A method for use in a multiphase power regulator including a plurality of phases coupled in parallel to provide a load current as a combination of phase currents, at a regulated output voltage, comprising:

determining, by a comparator, that a magnitude of a first signal exceeds a voltage from a phase of the multiphase power regulator;

in response to the determination, triggering a phase of the multiple phase power regulator to supply the associated phase current through a phase inductor;

decreasing the magnitude of the first signal to the comparator; and after decreasing the first signal's magnitude, then increasing the first signal's magnitude according to a time constant dictated by a resistance of a resistor and a capacitance of a capacitor.

17. The method of claim 16, further comprising sourcing a current through the resistor and capacitor.

18. The method of claim 16, wherein decreasing the magnitude of the first signal to the comparator includes turning on a switch by an output of the comparator, wherein the switch couples the first signal to a ground.

19. The method of claim 18, wherein increasing the first signal's magnitude comprises turning off the switch by the output of the comparator.

* * * * *